United States Patent Office 2,944,976
Patented July 12, 1960

2,944,976

FUNCTIONAL FLUIDS

Elmer E. Waters, Westfield, John J. Shatynski, Elizabeth, and John E. Koch, Jr., Bayonne, N.J., assignors to Celanese Corporation of America, New York, N.Y., a corporation of Delaware No Drawing. Filed Mar. 19, 1956, Ser. No. 573,056

8 Claims. (Cl. 252—76)

This invention relates to functional fluids and relates more particularly to water-base hydraulic fluids.

Water-base hydraulic fluids comprising mixtures of water, a glycol and certain polymeric thickeners are well known to the art and have been used for a wide variety of types of hydraulic mechanisms. However, the lubricating properties of these fluids have not been entirely satisfactory and it has therefore been found necessary to incorporate into these fluids anti-wear agents, such as dibutyl ammonium laurate, in order to prevent undesired rapid wearing of pump bearings and other parts of the hydraulic system. The addition of anti-wear agents does not solve the problem entirely since such agents tend to precipitate from the hydraulic fluid during use and may thereby become ineffective for their intended purpose.

It is accordingly an object of this invention to provide a novel water-base functional fluid having superior lubricating properties.

Other objects of this invention will be apparent from the following detailed description and claims. In this description and claims all proportions are by weight unless otherwise indicated.

In accordance with one aspect of this invention the novel water-base hydraulic fluid comprises an aqueous solution of a polyoxyethylene ether of castor oil, together with a glycol. Advantageously, the hydraulic fluid contains also suitable inhibitors of corrosion and an anti-foaming agent.

The polyoxyethylene ether of castor oil may be produced by the reaction of castor oil and ethylene oxide in known manner. One particularly suitable and preferred ether of this type contains about 60 to 70% of combined ethylene oxide and is a water-soluble viscous fluid at room temperature. Another, less desirable, polyoxyethylene ether of castor oil which may be used contains between 70 and 85% of combined ethylene oxide and is a water-soluble waxy solid at room temperature, becoming liquid at slightly elevated temperatures (e.g. 90–100° F.). In general suitable polyoxyethylene ethers of castor oil contain about 55 to 90% of combined ethylene oxide. Their average molecular weights may range from about 2,000 (for the type containing 55% ethylene oxide) to about 9,500 (for the type containing about 90% ethylene oxide). For best results the polyoxyethylene ether of castor oil used should be free from volatile contaminants such as monomeric ethylene oxide or volatile solvents. Commercial polyoxyalkylene ethers of castor oil may be readily freed from such contaminants by passing an inert gas through the material under vacuum.

The water-miscible glycol acts as a freezing point depressant for the hydraulic fluid and also aids in blending the other additives, e.g. the corrosion inhibitors, more uniformly in the fluid. While any of the water-miscible glycols may be employed, outstanding results have been obtained by the use of a mixture of dipropylene glycol and a hexylene glycol, such as 2-methyl pentanediol-2,4, e.g. in a ratio of 2:1 to 1:2, though it will be understood that either of these glycols may be used as the sole glycol in the composition or may be replaced by any of the other common glycols.

The anticorrosive agents may include a copper deactivator and a vapor phase inhibitor, of types well known to the art. The copper deactivator is an agent for preventing corrosion of those parts of the hydraulic system which are made of copper or alloys of copper. One suitable copper deactivator is sodium mercaptobenzothiazole, alone or mixed with an antioxidant therefor, such as salicylal ethanolamine; the latter compound functions also as a blending agent and is itself a copper deactivator. The vapor phase inhibitor is used to protect those metal surfaces of the hydraulic system which are exposed to the humid atmosphere above the liquid level in said system, e.g. the upper walls of reservoir of the hydraulic system. Suitable vapor phase inhibitors are known to the art and include the amines and amine salts, preferably the amine nitrites such as diisopropylammonium nitrite, diisobutylammonium nitrite and dicyclohexylammonium nitrite.

As antifoaming agents in the hydraulic fluids of this invention, the silicones, e.g. Dow-Corning's "Anti-Foam A" have been found to be suitable. The proportions of the water, polyoxyethylene ether of castor oil, and glycol in the hydraulic fluid of this invention may be varied. One suitable range is about 40 to 60%, preferably 40 to 50% of water, about 15 to 45%, preferably 20 to 30% of polyoxyethylene ether, and about 15 to 45%, preferably 25 to 35% of glycol. The corrosion inhibitors and antifoam agent are, of course, present in small concentrations, e.g. about 1% or less of the copper deactivator; on the order of about 2% or less of the vapor phase inhibitor; and a few parts per million (e.g. 3 to 60 p.p.m.) of the anti-foam agent.

The compositions of this invention are outstanding hydraulic fluids having excellent lubricating properties, superior to those of conventional commercial water-base hydraulic fluids containing added anti-wear agents. However, if it is desired to improve the lubricating properties even further, such anti-wear agents, e.g. dibutyl ammonium laurate, may be added to the compositions of this invention.

The following example is given to illustrate this invention further:

*Example*

25 parts of a water-soluble polyoxyethylene ether of castor oil having a combined ethylene oxide content of 65% and being a viscous fluid at room temperature (having a specific gravity at 25° C. of 1.0581; an acid value of 0.6; a hydroxyl value of 79.0; a pour point of about 60° F., and a viscosity, Gardner-Holdt at 25° C. of U+; and being soluble in ethanol, butyl acetate, ethoxyethanol, toluol and methyl ethyl ketone and insoluble in mineral spirits) is mixed with 44.5 parts of distilled water, 15 parts of 2-methyl pentanediol-2,4, 15 parts of di(1,2) propylene glycol, 0.5 part of a copper deactivator, such as that known as "NaCaP" (a 50% water solution of sodium mercaptobenzothiazole), 0.2 part of a vapor phase inhibitor, such as that sold as "Shell VPI–260" (dicyclohexylammonium nitrite) and 0.001 part of the silicone anti-foam agent known as "Dow-Corning Anti-Foam A Emulsion" (an aqueous emulsion containing 30% of those dimethyl polysiloxanes which are known as Anti-Foam A).

The resulting mixture is a liquid having a viscosity of 220 SUS at 100° F., and an autogenous ignition temperature above 1200° F. (ASTM D286–30). In the hot manifold test (Aeronautical Material Specification 3150 B4.9 published by the Society of Automotive Engineers)

the composition does not burn below about 1320° F. When its lubricating properties are tested by the Shell 4-ball wear test, described beginning at page 35 of "Lubrication Engineering" for August 1945, using a test run of 1 hour, a temperature of 167° F., 600 r.p.m., steel against steel contacting surfaces and a load of 1 kilogram, the scar diameter is 0.32 mm. When the same test is repeated under identical conditions except that the load is 40 kilograms, the scar diameter is 0.88 mm.

For comparative purposes, when the same 4-ball wear tests are applied to a widely used commercial water-base hydraulic fluid the scar diameters are 0.45 mm. (for the 1 kg. load) and 1.20 mm. (for the 40 kg. load). This commercial hydraulic fluid contains an added anti-wear agent.

It is to be understood that the foregoing detailed description is given merely by way of illustration and that many variations may be made therein without departing from the spirit of our invention.

Having described our invention, what we desire to secure by Letters Patent is:

1. A fire-resistant hydraulic fluid comprising a homogeneous mixture of about 40 to 60% of water, about 15 to 45% of a glycol, and about 15 to 45% of a polyoxyethylene ether of castor oil, said polyoxyethylene ether containing at least sufficient ethylene oxide units to make it water-soluble.

2. A fire-resistant hydraulic fluid comprising a homogeneous mixture of about 40 to 60% of water, about 15 to 45% of a glycol, and about 15 to 45% of a polyoxyethylene ether of castor oil having a combined ethylene oxide content of about 55 to 90%.

3. A fire-resistant hydraulic fluid comprising a homogeneous mixture of 40 to 50% of water, 25 to 35% of a glycol and 20 to 30% of a polyoxyethylene ether of castor oil having a combined ethylene oxide content of about 60 to 70%.

4. Composition as set forth in claim 3 and containing an antifoam agent.

5. A composition as set forth in claim 3 and comprising as the glycol a mixture of hexylene glycol and dipropylene glycol.

6. A composition as set forth in claim 3 and comprising as the glycol a mixture of 2-methyl pentanediol-2,4 and dipropylene glycol in weight ratio ranging from about 2:1 to about 1:2.

7. Composition as set forth in claim 4 and containing minor amounts of corrosion inhibitors comprising a copper deactivator and a vapor phase inhibitor.

8. A hydraulic system containing as the operative fluid a fire-resistant liquid comprising a homogeneous mixture of about 40 to 60% of water, about 15 to 45% of a glycol, and about 15 to 45% of a polyoxyethylene ether of castor oil, said polyoxyethylene ether containing at least sufficient ethylene oxide units to make it water-soluble.

References Cited in the file of this patent

UNITED STATES PATENTS

| | | |
|---|---|---|
| 2,200,494 | Fife | May 14, 1940 |
| 2,255,208 | Fife | Sept. 9, 1941 |
| 2,521,402 | Osborn | Sept. 5, 1950 |
| 2,558,030 | Zisman et al. | June 26, 1951 |
| 2,588,970 | Esposito | Mar. 11, 1952 |
| 2,602,780 | Zisman et al. | July 8, 1952 |
| 2,745,855 | Case | May 15, 1956 |
| 2,755,251 | Barker | July 17, 1956 |